(No Model.) 2 Sheets—Sheet 1.
E. TANNEGUY DE WOGAN.
FOCUSING MECHANISM FOR OPTICAL INSTRUMENTS.
No. 424,399. Patented Mar. 25, 1890.
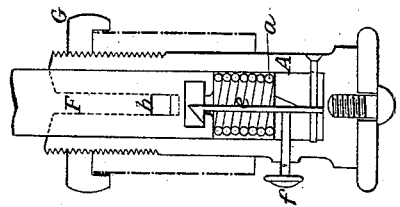
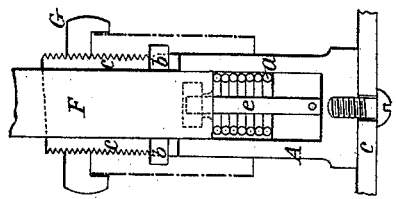
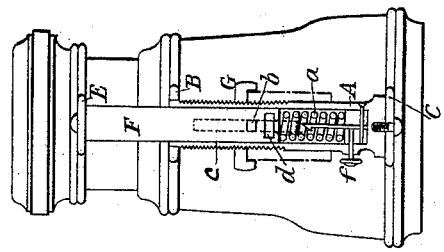
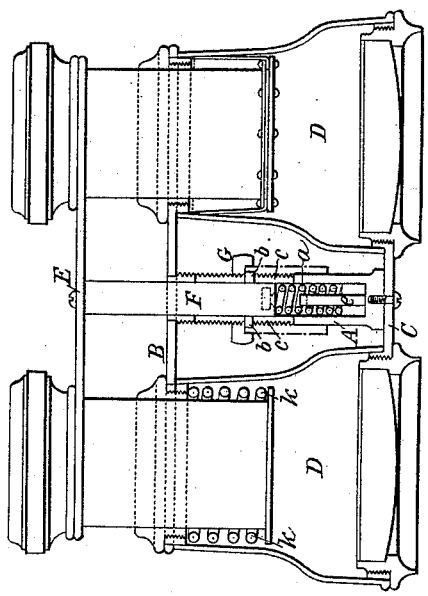
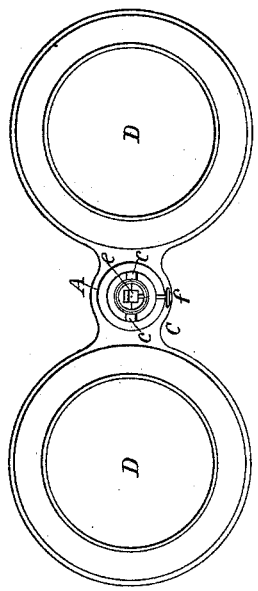
Witnesses:
Inventor:
Emile Tanneguy De Wogan
by Marcellus Bailey
his attorney (No Model.) 2 Sheets—Sheet 2.
E. TANNEGUY DE WOGAN.
FOCUSING MECHANISM FOR OPTICAL INSTRUMENTS.
No. 424,399. Patented Mar. 25, 1890.
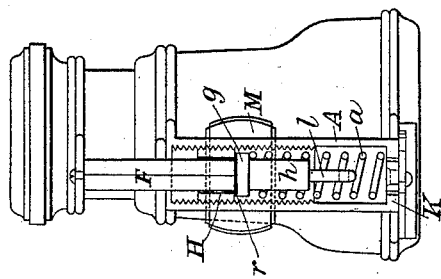
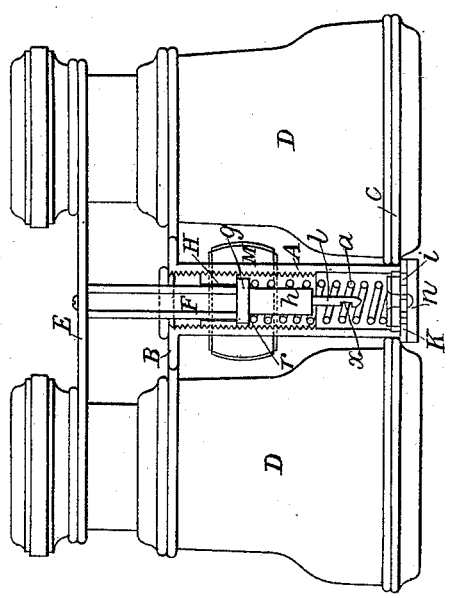
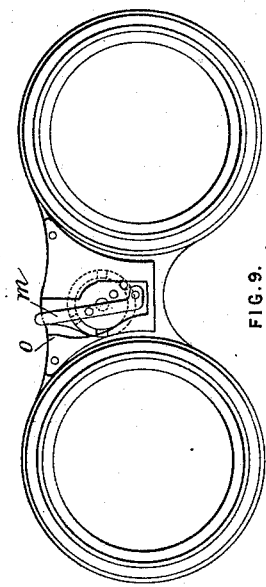
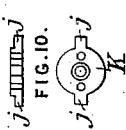
Witnesses:
Inventor:
Emile Tanneguy De Wogan
by Marcellus Bailey
his attorney.

UNITED STATES PATENT OFFICE.

EMILE TANNEGUY DE WOGAN, OF PARIS, FRANCE.

FOCUSING MECHANISM FOR OPTICAL INSTRUMENTS.

SPECIFICATION forming part of Letters Patent No. 424,399, dated March 25, 1890.

Application filed October 29, 1889. Serial No. 328,520. (No model.) Patented in France January 21, 1889, No. 195,511, and in Germany February 3, 1889, No. 48,806.

*To all whom it may concern:*

Be it known that I, EMILE TANNEGUY DE WOGAN, gentleman, a citizen of the Republic of France, residing at 179 Boulevard Pereire, Paris, in the Republic of France, have invented new and useful Improvements relating to the Focusing and Shutting Up of Binoculars, Opera, Field, and other Similar Glasses, (and which have been patented to me as follows: France, No. 195,511, dated January 21, 1889, and Germany, No. 48,806, dated February 3, 1889,) of which the following is a specification.

This invention relates to improvements in the focusing and shutting up of binoculars, opera, field, and other similar glasses, by means of which improvements the glasses can be instantaneously brought into focus or shut up, as required, suitable means being provided for adjusting the focus when desired. The invention will be described as applied to opera-glasses; but it is equally applicable to other glasses of similar construction.

According to this invention, the focus of the glasses is first adjusted to suit the eyes of the observer and the distance of the object or objects to be viewed, and the glasses can then be closed up and extended without interfering with the focus. The rack as at present in use (which is the cause of a considerable loss of time in focusing and in closing the instrument when done with, and also of continual repairs) is abolished and replaced by a tube containing a piston, the upper end of which is fixed to the transverse bar connecting the eye-pieces, and on the under side of the said piston a spring operates. A movable nut on the outside of the tube can be shifted to a determined point of this tube, and serves as an abutment for two or more pins fixed to the piston, in order to limit the range of the eye-pieces. By the aid of the spring beneath the piston, which may, if desired, be assisted by other springs placed within the tubes of the opera-glasses, the glass moves into focus of its own accord when the said piston-spring is permitted to act, and it can be shut up by exerting a light pressure on the eye-pieces. The piston is maintained in its closed position by a hook which catches in a notch cut in the lower end of the piston, or by any other convenient means. A stop or the like serves to disengage the hook or its equivalent, and consequently permits the spring to operate when the glasses are required for use; and in order that my invention may be more fully understood and carried into practice I will now proceed to describe the same with reference to the accompanying drawings, in which similar letters are used to indicate corresponding parts throughout.

Figure 1 is a partly-sectional front elevation of a pair of opera-glasses fitted with my invention. Fig. 2 is a vertical section through the axis of the piston-tube. Fig. 3 is a sectional plan of Fig. 1, and Figs. 4 and 5 are enlarged detailed views. Figs. 6 to 11 show modifications of my invention.

Referring to Figs. 1 to 5, a tube A is fixed at its two extremities to the upper transverse bar B and to the lower transverse bar C of the objective tubes D. To the transverse bar E, which connects the eye-piece tubes, a piston F is fixed by its upper extremity. This piston penetrates with gentle friction into the tube A. Passing through a hole in the transverse bar B, it is continually pushed upward by a spiral metallic spring $a$, which is supported on the base of the tube A. A milled nut G can be shifted with the hand to any point of the tube A, which is wormed on the outside. The piston F has at its lower extremity two or more pins $b$ $b$, which traverse mortises $c$, worked in the wall of the tube A, and diametrically opposite in the case of two, and equidistant where more than two are used.

It will be understood that according to the position of the nut G upon the tube A the piston, pushed by the spring $a$, will be stopped by the pins $b$, which butt against the under face or any other part of the nut G. By turning this nut in one direction or the other the eye-pieces will be displaced in relation to the objectives by compressing or giving play to the spring $a$, according to the direction in which the nut is turned.

The under face of the piston F has a cavity $d$, furnished with a flange, upon which catches the hook of the spring $e$, fixed to the base of the tube, when the eye-pieces are pressed toward the objectives to close the glass. To release the hook $e$ from the cavity $d$, the button $f$ (see Figs. 2 and 5) is pressed. The end of the rod of this button bears against or is attached to the rod of the hook $e$, which is thus acted upon and pushed back, disengaging the said hook $e$ from the cavity $d$ of the piston. The piston is then repelled by the spring $a$, and in rising displaces the transverse bar E and the eye-pieces connected therewith. The piston F stops at the position determined by the position of the nut G, which it was not necessary to shift in order to close the glasses. The action of the spring $a$ can be aided in various ways—for example, by means of springs $k$, operating by traction upon a collar fixed to the lower portion of the eye-piece tubes, as shown on the left-hand side of Fig. 1, or by india-rubber springs having the same effect, as can be seen on the right-hand section of Fig. 1. Springs could also be placed in the body of the instrument between the objective tubes and the ocular tubes. These springs would then be conical. I can also employ other suitable means for extending automatically the two parts of the opera-glasses, their distance apart being limited by abutments movable by hand to regulate the focusing-point. The springs can be placed between the two transverse pieces of the glasses.

In order to render the shutting of the instrument still easier and more rapid, I can adapt an additional spring passing through the interior of the piston and fixed at one extremity to the base of the tube, and at the other to the upper part of the piston or to the transverse bars B or E. This spring would operate by extension, while the lower spring operates by compression, and the glasses would be extended by a power equal to the difference between the strength of the two springs, the piston-spring being of course the greater. It would only be necessary to press a button in order to release a little retaining-hook, and thus to permit the interior spring, by virtue of its elastic action, to draw together the two parts of the opera-glasses.

It will be understood that this action of two conjugated springs can be arranged in various different ways. To the same end additional metallic or india-rubber springs could be placed in each body of the glasses, contracting the outside case of the objectives in order to facilitate the closing together of the draw-tubes.

In Figs. 6 to 10 I have shown a modification of my invention, in which the exterior worm on the tube A and the milled nut G, working thereover, as also the mortises $c$ and the pins $b$, working therein, are dispensed with, the tube A having a perfectly-smooth outer surface. Fig. 6 is a partly-sectional elevation of this modification. Fig. 7 is a vertical section through the axis. Fig. 8 is a plan of Fig. 6, and Figs. 9 and 10 are detail views.

The piston F, which is affixed to the transverse bar E of the eye-pieces, is of hexagonal or of any other except circular section, in order to guide a ring H, which is of similar shape on its inside or contiguous face, in the direction of its length, so that the said ring shall not turn. This ring H is screwed on its outside, so that it shall work in the interior worming of the tube A, to the outside of which the collar M is rigidly affixed or constructed in one therewith. The tube A is freely mounted in circular grooves cut in the transverse objective piece C and in the intermediate fixed transverse piece B, so as to rotate in the said grooves. By turning this tube more or less by means of the collar M in one direction or another the ring H is displaced in the barrel, so that it can be moved in either direction up or down. This ring H serves to limit the distance between the transverse bar E of the eye-pieces and of the intermediate transverse bar B. For this purpose the piston F has a shoulder $g$, and around the tail-piece $h$ of the said piston there is disposed a spiral metallic spring $a$, arranged between the shoulder $g$ and the transverse piece C, which forms the base of the tube A. It will be understood that this arrangement permits the drawing out of the opera-glasses to be modified according to desire. When the glasses are in the position shown in Fig. 6, the piston F can be made to re-enter the tube A, in order to reduce the glasses to their minimum volume. In carrying out this operation the shoulder $g$ of the piston compresses the spring $a$. It is by permitting the expansion of this spring that the piston and the eye-pieces are sharply pushed upward until the shoulder $g$ of the piston strikes against the ring H. An elastic ring $r$ deadens the noise of this contact.

In order to facilitate the unmounting and remounting of the spring $a$, the objective bar C is pierced with a circular hole with two slits $i$ $i$, diametrically opposite, and this hole is closed by a plug K. (Partly seen in Figs. 9 and 10.) It is provided with ears $j$ $j$, which are passed through the slits $i$ $i$, and which when the plug is turned keep it in its place.

The glasses are kept closed by means of an arrangement consisting of a rod $l$, the extremity of which, being hook-shaped, has a slit $x$, destined to receive or engage with a bolt or catch $m$, Figs. 6 and 8, placed under a plate $n$, fixed to the frame of the opera-glasses, hiding the plug K. This catch $m$ is controlled by a spring $o$ and its extremity appears outside, so that it may be worked by the finger, in order to release the said bolt or catch $m$ from the slit $x$ of the rod $l$, to set the piston F in motion and to produce the automatic drawing out of the glasses by the expansive action of the spring $a$.

Fig. 11 shows a further modification of the regulating device, drawn to a smaller scale, in which the nut G works on a screw formed on the outside of the tube A. This nut G limits the position of the ring or frame $p$, connected to the transverse bar B of the eye-pieces by tie-rods $q$ or metallic wires or other suitable substance, and hence limits the degree of separation of the objective and eye pieces. The piston F works within the tube A, which in this case is fixed in position, as hereinbefore described with reference to Figs. 1 to 5.

As will be understood, the essential feature of my invention consists in the abutment of variable position, which limits the advance of the piston producing the drawing-out motion of the eye-pieces and objectives. The manipulation of this abutment can be made either on the central tube or on the side near the eye-pieces or on the side near the objectives, the eye-pieces moving backward or the objective pieces advancing, according to the position occupied by the arrangement producing the automatic expansion or opening of the opera-glasses.

What I claim is—

1. The herein-described binoculars, opera, field, and other glasses, provided with a central tube fixed to the transverse bar C of the objectives, a spring-actuated piston F, operating within said tube and limited in its motion by the nut G, working on a screw formed on the outside of the central tube, and a hook or catch or equivalent for retaining the glasses in their shut or closed-up position, substantially as and for the purposes set forth.

2. In binoculars, opera, field, and other glasses, the combination of the central tube, the objectives, a spring-actuated piston operating within said tube, and the springs located within the body of the cases D, substantially as set forth.

3. The herein-described binoculars, opera, field, and other glasses, provided with springs for instantaneously opening out or extending the glasses when the said springs are released, and automatically operating adjustable stop mechanism for limiting the motion of said springs, substantially as described.

E. TANNEGUY DE WOGAN.

Witnesses:
A. FOUCHE,
C. WEIS.